United States Patent
Fujita et al.

[11] 3,911,069
[45] Oct. 7, 1975

[54] METHOD OF MANUFACTURING MULTILAYERED ARTICLES

[75] Inventors: Hideo Fujita, Amagasaki; Kozo Hachisuka, Osaka; Kiyoshi Furukawa; Tsutomu Matsutani, both of Amagasaki; Kei Kobayashi, Ueda; Shiro Yonekura, Ueda; Akiyoshi Takano, Ueda; Hiroshi Nakazawa, Ueda, all of Japan

[73] Assignees: Dainichi-Nippon Cables, Ltd., Amagasaki; Mitsuba Mfg. Co., Ltd., Tokyo, both of Japan

[22] Filed: Nov. 13, 1972

[21] Appl. No.: 305,773

[30] Foreign Application Priority Data
Nov. 11, 1971 Japan.............................. 46-90197

[52] U.S. Cl................... 264/23; 264/25; 264/102; 264/174; 264/178 R; 264/232; 264/233; 264/344; 425/113
[51] Int. Cl.$^2$.................. B29C 25/00; B29F 3/10
[58] Field of Search........ 264/101, 102, 174, 178 R, 264/349, 22, 23, 25, 232, 233, 344; 425/71, 113

[56] References Cited
UNITED STATES PATENTS

| | | | |
|---|---|---|---|
| 2,069,087 | 1/1937 | Forstrom et al............... | 425/113 X |
| 2,401,551 | 6/1946 | Cook, Jr........................ | 425/113 |
| 3,025,565 | 3/1962 | Doriat et al................... | 264/102 |
| 3,051,992 | 9/1962 | Bradley......................... | 264/178 R |
| 3,067,462 | 12/1962 | Kullgren....................... | 264/102 UX |

Primary Examiner—Jan H. Silbaugh
Attorney, Agent, or Firm—Sughrue, Rothwell, Mion, Zinn & Macpeak

[57] ABSTRACT

A method of manufacturing a multilayered fabricated article which comprises extruding an uncured rubber or plastic composition from a first extruder into a vacuum chamber, comminuting or slicing the extruded composition in the vacuum chamber, extruding the comminuted or sliced composition from a second extruder around a core which has been dried and heated prior to the second extrusion introducing the core with the extruded composition therearound into a curing bath while maintaining the covered core substantially straight between extrusion and introduction into the curing bath, curing the composition extruded around the core at an elevated temperature and at atmospheric pressure, the sum of the L/D ratios of the first extruder and the second extruder not exceeding 24.

25 Claims, 10 Drawing Figures

METHOD OF MANUFACTURING MULTILAYERED ARTICLES

BACKGROUND OF THE INVENTION

1. Field of the Invention

This invention relates to a method for manufacturing mutlilayered fabricated articles, such as an electric cable covered with a cured rubber or plastic or a multilayered hose. More specifically, the invention provides a method for manufacturing such articles wherein an uncured rubber or plastic layer coated onto a core is heated and cured by means of a heating medium, such as a molten eutectic mixture of inorganic salts, at atmospheric pressure.

2. Description of the Prior Art

A curing process where an uncured fabricated article is cured by being immersed in a high temperature bath at atmospheric pressure has the following advantages as compared to a conventional high-pressure-steam-vulcanization process:

1. the equipment employed is simple; and
2. operation of such a process is easy.

Such a non-pressurized curing process has been used in the manufacture of cured rubber or plastic fabricated articles, such as a window frame packing. However, it has not yet been put into commercial practice for the manufacture of multilayered fabricated articles, such as an electric cable covered with cured materials or a hose composed of a multilayered structure.

The cured rubber or plastic layers of such multilayered fabricated articles are required to have an excellent electrical or mechanical property, but the non-pressurized curing process has, heretofore, failed, for the following reasons, to give cured layers having these properties.

1. Because air and moisture entrapped in a rubber or plastic to be applied cannot be completely removed therefrom, the resulting cured rubber or plastic contains pores.
2. Moisture or volatile substances contained in the core described later or air enclosed at the interface between the core and the covering layer are heated and expand in volume in the course of the curing process to cause separation of the covering layer from the core.

In order to prevent the formation of pores in the cured article in the non-pressurized curing process, there is known a method where calcium oxide is incorporated in the rubber or plastic to absorb moisture in the composition which causes bubble formation. However, since the composition contains, besides moisture, various volatile substances which cannot be absorbed by calcium oxide, this method cannot prevent the formation of voids in the cured article which is ascribable to these volatile substances. Another method of preventing formation of voids is to use a vented single-screw extruder having a barell with a vent hole, for example, as described in O. W. Baumgarten, Kautschuk und Gummi, 19 (8), Page 494 (1966). However, this method has proved entirely unsatisfactory for removing moisture and volatile components present in a rubber or plastics, and it is difficult to provide multilayered shaped articles free from porosity to a satisfactory extent.

SUMMARY OF THE INVENTION

According to this invention, there is provided a method for manufacturing a multilayered fabricated article which comprises extruding an uncured rubber or plastic composition by a first extruder into a vacuum chamber, comminuting or slicing the extruded composition in said chamber by a cutter, feeding the sliced composition into a feed hopper of a second extruder while maintaining the sliced composition under reduced pressure, extruding the composition by means of the second extruder around a core which has been dried and heated prior to such extrusion, introducing the covered core without bending it into a curing apparatus kept at an elevated temperature wherein the uncured rubber or plastic layer around the core is heated and cured, said first and second extruders being provided such that the sum of the L/D ratio of the first extruder and the L/D ratio of the second extruder does not exceed 24.

DETAILED DESCRIPTION OF THE INVENTION

The invention will now be described in greater detail by reference to FIG. 1. A core W supplied from a drum A passes through a heat-drying device B prior to being fed into a crosshead D of an extruder E, in which the core is fully dried, usually at a temperature of above 90°C. Then, the dried core passes through an additional heating device C, in which the surface of the core is heated, usually to a temperature not lower than the temperature which is 90°C. lower than the curing temperature. The heated core is immediately fed into the crosshead D. As explained later in detail, subsequent processings involve curing in curing bath F, an optional washing at washing station at G and winding reel H.

As will be appreciated by one skilled in the art, the present process can be used to effectively coat any type of core material. Examples of core materials usually coated with plastics or rubbers on a large industrial scale are an electric conductor such as a stranded bare conductor, a conductor covered with a layer of cured rubber or plastics as twisted strands of a plurality of insulated conductors with or without jute filler, or hose cores such as a cured rubber or plastic tubular body or multilayered cured rubber or plastics tubular body which may contain a spring in the spaces between the layers. Numerous other core materials amenable to processing in accordance with the present invention will be apparent to one skilled in the art.

Drying of the core in the drying device B should be performed sufficiently so that when the core is heated in a heat-curing step described hereinafter, the amount of gases generated from the core is reduced. If the core is insufficiently dried in the drying device B, when the core W is covered with a rubber or plastic composition and introduced into a curing trough gases evolved from the core accumulate between the core and the covering layer and cause the separation of the covering layer from the core.

The drying time in the device B varies greatly with such factors as the composite structure and size of the core or the drying temperature. For example, in the case of cores containing jute filler which is rich in moisture or oil, the drying time is usually, e.g., 2 to 24 hours at 90°C or 40 minutes to 2 hours at 150°C, or 5 to 10 minutes at 180°C. In the case of a conductor insulated with a cured rubber or plastic, the drying time is 1 to 3 hours at 90°C, 20 minutes to one hour at 105°C, and 1 to 5 minutes at 180°C. The higher the core drying temperature is, the shorter the drying time is. However, since too high a temperature causes deterioration of the core, the drying temperature is preferably not higher than 200°C, although this figure varies according to the material that constitutes the core.

Figure 1:
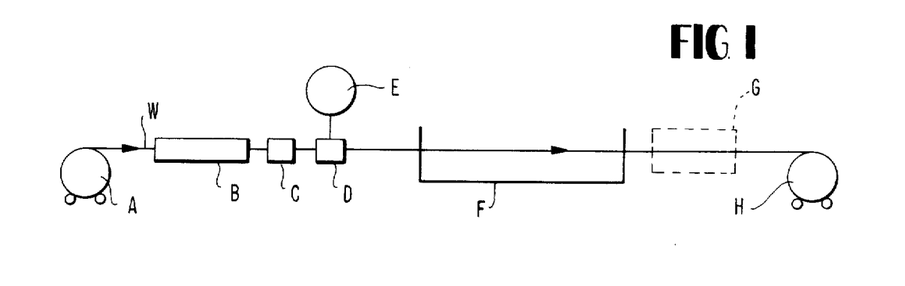
FIG. 1 is a schematic diagram showing the production process of a cured rubber or plastic coated cable in accordance with the present invention.

When it takes more than one hour to dry the core, it is more practical to dry the core in a batch manner rather than to dry continuously as shown in FIG. 1. The core may be pre-dried at a temperature lower than 90°C, and this can lead to a shortening of the drying time in the drying device B.

In this invention the following test can be employed to determine whether the core is sufficiently dried. A predetermined length (preferably 1 meter or more) of the dried core is cut off, and the cut faces are immediately sealed at both ends. Then, the core is heated at 90°C for 30 minutes, and the decrease in weight of the core is determined. If the weight decrease is not more than 0.1% of the total weight of the core segment before heating, it is judged to be fully dried.

If the surface temperature of the core entering the crosshead D is low, air enclosed between the core surface and the rubber or plastic layer thereon expands in the course of curing, and tends to cause separation of the covering layer from the core. It is desirable therefore that the core (at least the surface thereof) be heated by the additional heating device C to a temperature not lower than a temperature which is 90°C, preferably 60°C, lower than the curing temperature.

If the drying of the core in device B is performed at a high temperature, and as a result the core is fully dried and the temperature of the surface layer of the core rises to a temperature more than the temperature which is 90°C lower than the curing temperature, additional heating of the core in device C may be omitted.

The drying device B and the optional additional heating device C may be of any heating type such as a hot air drying type, an infrared ray heating type or an electric heating type. The especially preferred drying device is of the type wherein hot air, preferably dried, air, is circulated there through or continuously supplied thereto.

The core W dried and heated to a high temperature is then fed into the crosshead D. Where moisture absorption or a temperature drop in the core is likely to occur before it reaches the crosshead D, it is preferred to use a means for the avoidance of moisture-reabsorption and temperature drop of the core, such as a hot air tunnel, between the device C and the crosshead D.

The core W fed to the crosshead D is covered with an uncured composition of a natural or synthetic rubber or a plastic, or a mixture thereof. Numerous rubbers and plastics are useful in the present invention, and it will be apparent to one skilled in the art that substantially any rubber, plastic material or mixture thereof, be they natural or synthetic, can be subjected to the processing of the present invention so long as they are extrudable and cureable.

Representative of the numerous rubber and plastic materials which can be used in the present invention are diene rubbers such as natural rubber, butadiene rubber, nitrile rubber, styrenebutadiene rubber, polyisoprene rubber and the like, polyolefins such as ethylene-propylene copolymer, ethylene-propylene diene terpolymer, polyethylene, ethylene-vinyl acetate, ethylene-ethyl acrylate, butyl rubber and the like, halogenated polymers such as chlorinated polyethylene, chlorosulfonated polyethylene, epichlorohydrin rubber, polychloroprene, chlorinated butyl rubber, brominated butyl rubber and the like, polysulfide rubber such as Thiokol Rubber and the like, and inorganic polymers such as silicone rubber and the like. Mixtures of such materials may, of course, also be used.

Needless to say, the uncured rubber or plastic composition may, and generally does, contain additives as are commonly used in the product area involved, e.g., fillers, pigments etc. No particular novelty is attached to the use of such additives as they are conventional and merely serve their art recognized function in the present invention.

The method of extruding the uncured composition while removing moisture and other volatile matter will be described with reference to FIG. 2. The uncured composition is extruded in the form of thin cords into a rectangular vacuum chamber 3 by a first extruder 1 equipped with a screw 13 and a breaker plate 12 whose front surface 11 is open to a vacuum chamber 3. The extrudate is immediately sliced by a rotating cutter 2 provided within the vacuum chamber and facing the front surface 11 of the breaker plate 12. The cutter 2 is fixed to a rotary shaft 21 which extends through the wall 24 of the vacuum chamber 3 and is driven by a motor M via a belt 29 and a pulley 26. The rotary shaft 21 is supported by a bearing 23 which is secured to the side wall 24 of the vacuum chamber 3 by bolts. The bearing 23 is supported by an arm 27 secured to a pedestal (not shown) of the first extruder 1. Reference numeral 35 represents a seal. The distance between the cutter 2 and the breaker plate 12 can be adjusted by turning an adjustable screw 25 screwed to the rear end of the bearing 23 to push a projection 22 provided on the turning shaft 21 or to retract the screw from the projection. The vacuum chamber 3 is evacuated by a vacuum pump (not shown) which communicates with an exhaust port 31, and the reduced pressure within the chamber 3 is shown by gauge 33 during operation. The thin cords extruded are sliced into fine flakes by the cutter 2, and the flakes fall onto a feed roller 42 provided at the bottom of the chamber 3. The flakes are fed by the feed roller 42 into a second extruder 4 provided with a screw 43, a breaker plate 45 and crosshead D. The feed roller 42 or other type of feeding device provided in feed section 41 of the second extruder is effective for feeding into the second extruder the flakes which tend to undergo a bridging phenomenon, i.e., to clog the feed space.

The flakes stick to the inner wall of the vacuum chamber 3. A polytetrafluoroethylene sheet 34 bonded on the inner surface of the vacuum chamber 3 is effective to prevent such adhesion. Instead of a polytetrafluoroethylene sheet, other methods for preventing the adhesion of the rubber or plastic can be used, for example, a silicone rubber sheet lining or a coat of silicone oil may replace the polytetrafluoroethylene sheet.

The flakes, during their stay in the vacuum chamber 3, are dried and degasified under reduced pressure. This drying and degasifying are more fully and more rapidly performed when the thickness of the flakes is small and the ratio of the surface area to volume of the flakes is large. Hence, the thickness of the flakes is preferably not more than about 40 microns, especially not more than about 20 microns. The degree of vacuum of the vacuum chamber 3 is preferably as high as is possible for good drying and degasifying. Usually, the pressure within the vacuum chamber 3 is maintained at about 100 mmHg or less, preferably about 50 mmHg or less.

For most materials as are commonly applied in extrusion processes around a core the residence time in the vacuum chamber is suitably selected so as to be in the range of from about 0.5 seconds to about 20 seconds. As a general rule, the residence time will be from about 2 to about 10 seconds. It will be apparent to one skilled in the art that these figures can vary greatly, especially upwardly, and factors such as the flake size, degree of vacuum, surface area etc. can all be appropriately varied so as to permit operation at various vacuum chamber residence times.

Furthermore, in order to degasify and dry the flakes with good efficiency within a short time, it is of utmost important to mix the composition thoroughly in the first extruder. For this reason, it is preferred that the first extruder has an L/D ratio (ratio of screw length to barrel inner diameter) of at least 8, especially within the range of from 10 to 12 and a compression ratio (the ratio of the channel volume of the feed section of the screw to that of the forward end portion of the screw) of 1.2 to 3.

On the other hand, the second extruder merely has the function of extruding the flaky rubber or plastic composition which has been sufficiently dried and degasified in advance. Therefore, in order to prevent scorching of the composition due to the heat generated in the course of mixing of the composition by the screw in the second extruder, the second extruder preferably has as small an L/D ratio as is possible, usually an L/D ratio of 4 to 10.

In the extruder E used in this invention, the composition is subjected to the heat of friction caused by the high speed cutter at the time of slicing in addition to the heat generated in the first and second extruders. Therefore, in order to prevent scorching of the composition it is necessary for the extruder used in this invention to reduce the heat generated in the extruders in the course of extrusion. To accomplish this purpose it is essential that the sum of the L/D ratios of the first extruder and the second extruder be not more than 24, preferably not more than 20.

An ordinary die and nipple may be used in the crosshead of the second extruder.

It is not always necessary to evacuate within the nipple during extrusion of the rubber or plastic composition onto the core, with a view to preventing the entry of air between the core and the coated layer. This evacuating operation is preferred, however, since it gives an extruded product having better contact between the core and the coated layer.

When a stranded core of a plurality of insulated conductors is sheathed with the extruded composition, the surface of the extruded sheath often becomes uneven because of the strands. The occurrence of such unevenness can be prevented by utilizing the long land die and the long land nipple shown in FIG. 3.

Figures 2, 3, 4:
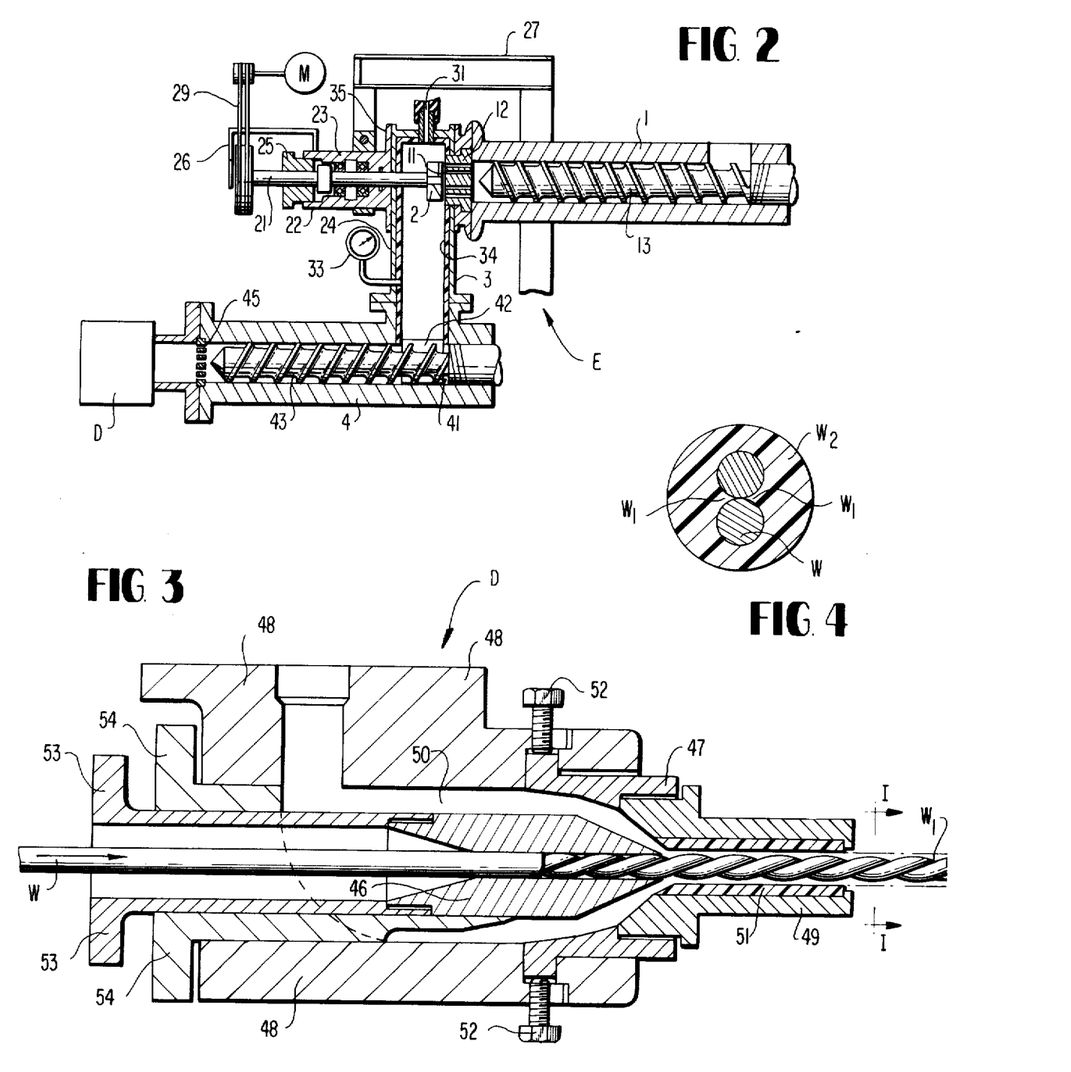
FIG. 2 is a longitudinal sectional view of one example of the extruder E shown in FIG. 1.
FIG. 3 is a longitudinal sectional view of a cross-head equipped with a long land die and a long land nipple.
FIG. 4 is a sectional view taken along line I—I of FIG. 3.

Referring now to FIG. 3, the cross head D is provided with a long land nipple 46 supported by a nipple holder 53 and a long land die 49 secured to the main body 48 of the crosshead by a die holder 47, and a compound passageway 50 is provided between the main body 48 and the nipple 46. Reference numeral 54 represents a flow guide. The long land die 49 is lined on its inner surface with a polytetrafluoroethylene coating cylinder or tube 51, and its relative position with respect to the nipple 46 can be adjusted by four thickness-adjusting screws 52. When such a long land die is used, the flow resistance of the composition within the die increases and the presssure of the composition within the die is increased. As a result, the valley portion W1 of the core is well filled with the composition to give a coated layer W2 free from surface unevenness on the core W as shown in FIG. 4.

Back flow of the composition into the nipple is prevented by the continuous travel of the core W and the long land of the nipple 46 which causes an increase in the back flow resistance of the composition. The required length of the land portion of the long land die varies with the viscosity of the composition, and increases with increasing viscosity. Usually, the land length is at least 15mm, preferably at least 50 mm. On the other hand, the land length of the long land nipple may be shorter as the viscosity of the composition is larger, and as the rate of feed of the core is larger. Generally, one half that of the long land die. flow, the land length of the nipple is preferably at least one half that of the long land die.

After leaving the crosshead D, the core W covered with the uncured composition is introduced into curing apparatus F, as shown in FIG. 1, while it is straight, i.e., without substantial bending, in which the covering layer is heated and cured. It is essential in the present invention that the covered core W should be introduced into the curing bath while straight without being excessively bent during its moving from the crosshead to the entrance of the curing bath. Otherwise, the uncured covering layer which is still readily deformable may be deformed by bending or separated from the core, and this degrades the quality, especially the mechanical and electrical properties, of the resulting cured multilayered fabricated article.

FIGS. 5 to 10 illustrate the three typical types of curing baths which permit introduction of the core in a substantially straight manner. In these figures, the same symbols designate the same parts.

As will be appreciated by one skilled in the art, the essential purpose of the curing of the present invention is to raise the temperature of the uncured rubber or plastics layer to a temperature above the decomposition point of the curing agent contained therein, and to maintain the initially uncured rubber or plastic layer at a temperature above the decompostion temperature of the curing agent for a time sufficient to permit curing to be completed.

The curing agent used in the present invention and the amount thereof are not overly critical, i.e., any thermally decomposable curing agent used in the prior art to cure rubber or plastics composition may be used in the present invention at amounts as are commonly used in this art. As will be apparent, of course, the curing agent should not be overly volatile to avoid excessive loss thereof during drying or extrusion under reduced pressure and to avoid the formation of excessive pores in the cured rubber or plastic layer. In this regard, while preferred curing agents are substantially completely non-volatile at the curing temperatures used, slightly volatile curing agents may be used so long as they do not cause any significant degree of core/coating layer separation or voids in the cured layer. User requirements will obviously dictate the type of curing agent used, as will be apparent to one skilled in the art.

Among the many organic and/or inorganic curing agents which may be used in the present invention, preferred curing agents include curing agents such as:

1. organic peroxides or mixtures of peroxides and sulfur or mixtures of peroxides and dioximes. Examples of the peroxides include dicumyl peroxide, di-tertiary-butyl peroxide, 1,1'-di-tertiary-butyl peroxyethane and 1,4-bis(tertiary-butyl peroxy) diisopropylbenzene, and examples of the dioximes include p-quinone dioxime and p,p'-dibenzylquinone dioxime.

2. thiurams, mixtures of thiurams and thiazoles, mixture of thiurams and imidazolines, mixtures of thiurams and litharge or mixtures of thiurams and dithiocarbamates. Examples of thiurams include tetramethylthiuram monosulfide, tetramethylthiuram disulfide, dimethyldiphenylthiuram disulfide, dipentamethylenethiuram monosulfide and dipentamethylenethiuram tetrasulfide. Examples of the dithiocarbamates include zinc dimethyldithiocarbamate, zinc diethyldithiocarbamate, selenium diethyldithiocarbamate and tellurium diethyldithiocarbamate. Examples of the thiazoles include 2-mercaptobenzothiazole, dibenzothiazyl disulfide, a zinc salt of 2-mercaptobenzothiazole and N-diethyl-2-benzothiazyl. A suitable example of the imidazolines is 2-mercaptoimidazoline.

3. mixtures of zinc oxide, magnesium oxide and imidazolines such as 2-mercaptoimidazoline.

4. mixtures of the above-described dioximes and metal oxides. Examples of the metal oxides include red lead ($Pb_3O_4$) and litharge (PbO).

5. sulfur or mixtures of sulfur and the above-described thiurams. These curing agents and the mixtures of the curing agents are suitably selected and formulated in accordance with conventional procedures, depending upon the type of the rubber or plastic base used.

As indicated, the amount of curing agent present is in accordance with the teachings of the prior art. Usually greater than about 0.1 % will be present, based on the weight of rubber and/or plastic, and generally no improved properies are obtained by using more than about 10 % by weight based on the weight of rubber or plastic. It will be apparent to one in the art that the activity of various curing agents will vary greatly, and values lesser and greater than the above can be used with success.

The curing agent, or agents, used will generally be incorporated into the uncured composition prior to the beginning of processing, and this can be done by any art recognized procedure. Usually the curing agent(s) will merely be introduced at the same time as other desired additives all added to the uncured rubber or plastic composition.

In certain instances, mixed curing agent system, i.e., materials which decompose at varying temperatures, will be used with stepped curing temperatures to achieve certain preferred effects. Such procedures are well known in the art, and need not be described in detail.

As will be apparent, the curing agent or agents used should not decompose and initiate curing to any substantial degree during extrusion of the uncured rubber and/or plastic composition, i.e., extrusion is at a temperatures and time below that which will cause substantial curing.

Any heating medium may be used in the present invention which does not harmfully react with the coating layer and which can be raised to a temperature sufficient to promote curing without deterioration of core material. Such materials are well known to the art, and the selection of the exact heating medium used is not overly critical since its function is primarily a physical one, i.e., to transfer heat into the initially uncured rubber and/or plastic covering or coating layer.

Exemplary of the heating mediums suitable for use in the present invention are liquid mediums such as organic liquids having a boiling point greater than about 300°C, preferably, greater than about 350°C such as polyglycols, silicone oils, mineral oils and the like, molten eutectic mixtures of inorganic salts such as a mixture of $KNO_3$, $NaNO_3$ and $NaNO_2$ etc., molten eutectic mixtures of metals such as a mixture of 42 % tin and 58 % bismuth, hot air as disclosed in Japanese Patent Publication No. 19714/1969 and fluidized bed as disclosed in Japanese Patent Publication No. 26561/1963. Alternatively, heat can be given by ultrasonic high frequency as described in Kautschuk und Gummi.Kunststoffe, Vol. 22 12, page 717(1969).

No matter what type of heating medium is used, of course, it is still necessary that the core coated with the uncured composition be introduced into the curing bath (the term curing bath is used generically in this discussion in the sense that it is an area where the uncured coating layer is contacted with the heating medium used). In the Examples which follow, on the other hand, the term curing bath is used to denote a liquid heating medium with which the core/coating layer assembly is contacted.

It is most preferred, for ease of operation and from the viewpoint of apparatus cost and maintenance, to use a curing bath containing a liquid heating medium. This best mode of practicing the invention is described in great detail in the examples, but it is to be understood other equivalent heating means as exemplified above can be used with success, since the primary function of the curing bath (used in the general sence) is to permit the curing agent to be decomposed or brought to a state whereby curing is initiated at elevated temperature.

From the above discussion it will be apparent that the residence time in the curing apparatus can vary greatly and is not overly critical so long as the desired curing is obtained. For most typical core/coating layer systems, however, curing will be completed in less than about one-half hour on a commercial scale, more generally less than about 10 minutes being required. On the other hand, considering the scale of commercial operation, seldom would one have any reason to cure faster than in about 20 seconds, and usually a curing apparatus residence time of about one-half minute to about 10 minutes will be commonly used in practicing the present invention.

Figure 7:
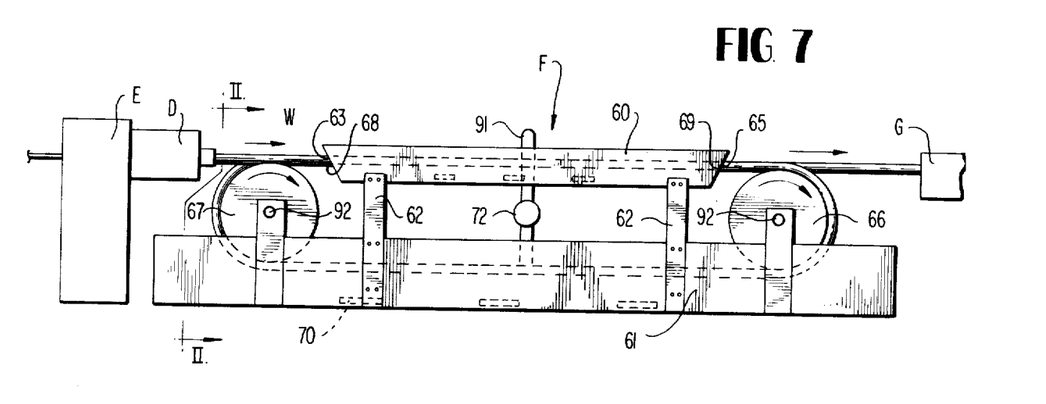
FIG. 7 is a front elevation of another example of curing apparatus for use in the present invention.
Figures 8, 10:
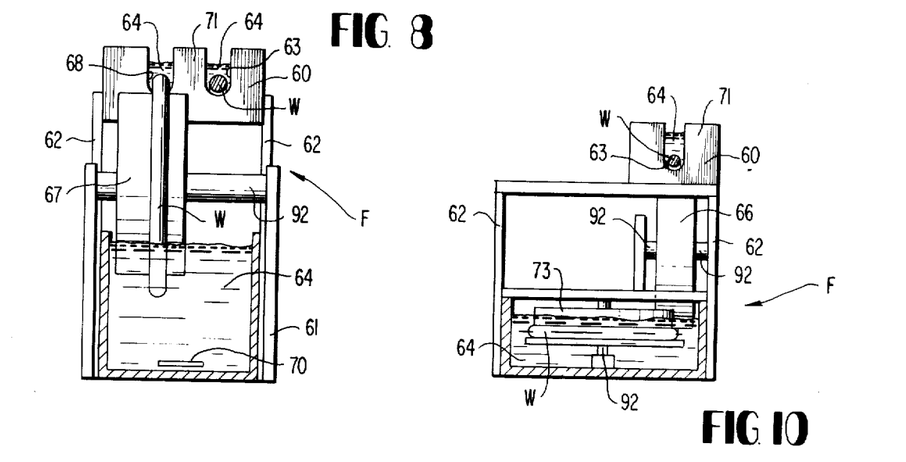
FIG. 8 is a sectional view taken along line II—II of FIG. 7.
FIG. 10 is a sectional view taken along line III—III of FIG. 9.

In the curing bath shown in FIGS. 7 and 8 (to be referred to as a type-II curing apparatus), passing through a core entrance 63 of an upper curing trough 60 the core W covered with the uncured layer comes into the trough 60 provided above a lower curing trough 61 by means of supports 62 fixed to the outer wall of the lower curing trough 61, and the surface of the covering layer and the immediate vicinity of the covering layer are heated and cured by a liquid heating medium 64 kept at an elevated temperature in the upper trough 60 and at atmospheric pressure. After leaving the upper curing trough 60 through an exit 65, the core is introduced into the lower curing trough 61 via a turning wheel 66 having a shaft 92 located at the rear of the exit 65 (a part of the wheel is immersed in the liquid medium 64 within the lower curing trough 61), and is again heated by the liquid medium 64 in the lower curing trough. Then, the core is again introduced into the upper curing trough 60 from another entrance 68 by means of a turning wheel 67 having a shaft 92 around which the wheel rotates located at the opposite end of the trough as the turning wheel 66, and is heated for a third time. As a result, the covering layer is completely cured, and the core leaves the upper curing trough 60 from exit 69.

The liquid medium in both the upper and lower curing troughs is maintained at a temperature tightly cures the covering layer, usually at about 150° to about 250°C., by an electric heater 70.

For most heating mediums, be they liquid, solid or gas, curing is at 150° to 250°C, with a preferred range being from 170° to 230°C. At a temperature below the lower limit of the range (lower than 150°C), curing requires a longer period of time, while at a temperature higher than the upper limit (higher than 250°C), some rubber and plastic materials tend to deteriorate. A temperature within the above adequately permits curing time to be balanced against the danger of deterioration, and by heating the uncured rubber or plastic to this temperature efficient operation is easily maintained.

After the surface layer of the coated layer has been tightly cured, the core may be bent without deformation and separation of the coated layer. The heating medium which is constantly flowing out from inlets 63 and 68 and outlets 65 and 69 of the upper curing trough falls into the lower curing trough, and liquid medium in the upper trough is replenished with heating medium transfered from the lower trough by pump 72 through pipe 91.

Figure 9:
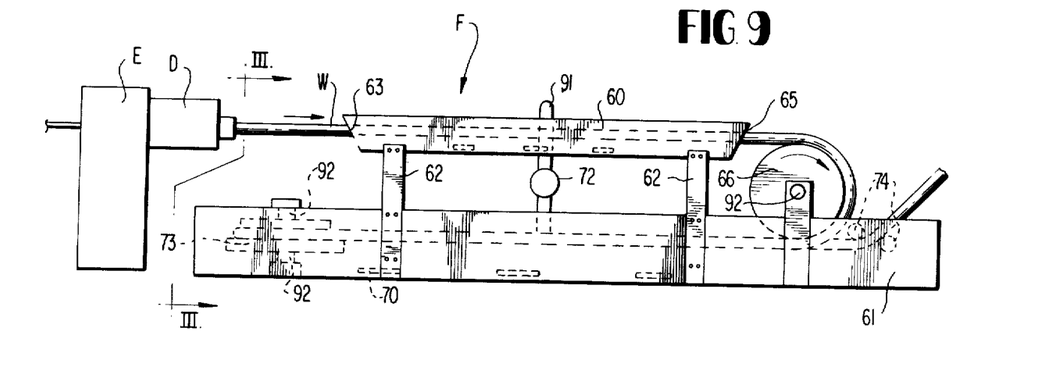
FIG. 9 is a front elevation of still another example of curing apparatus for use in the present invention.

In the curing bath shown in FIGS. 9 and 10 (to be referred to as a type-III curing apparatus), a horizontal turning wheel 73 immersed in the liquid medium is installed in the lower trough instead of the turning wheel 67 of the type-II curing bath. In this construction, the core W is turned by the turning wheel 73, and again passes through the lower curing trough. Then, it leaves the lower curing trough via a pair of guide wheels 74. These guide wheels are movable to any desired position of the curing trough to adjust the curing time for the core as desired.

Figure 5:
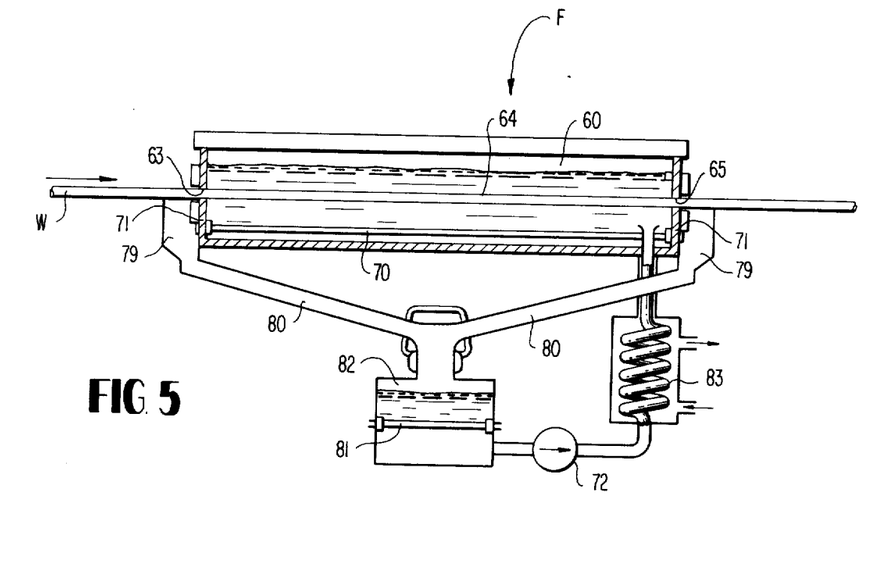
FIG. 5 is a longitudinal sectional view of one example of a curing apparatus for use in the present invention.
Figure 6:
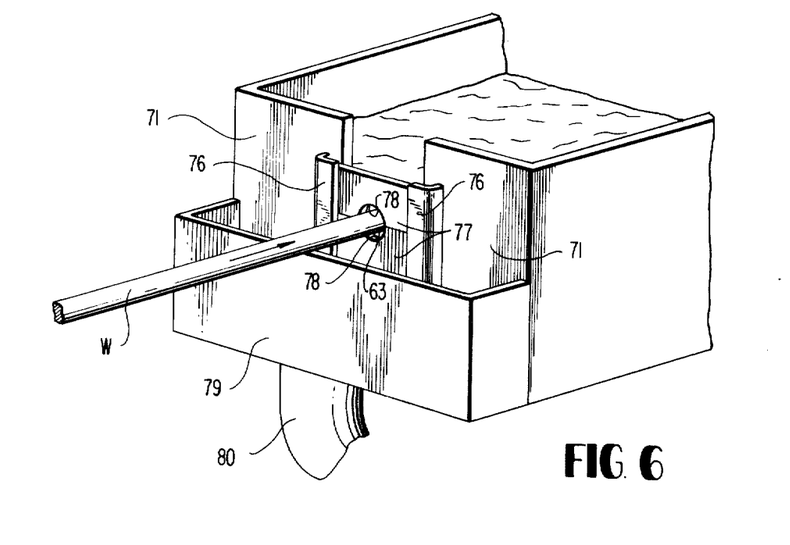
FIG. 6 is a perspective view of the feed portion of curing apparatus shown in FIG. 5.

The apparatus shown in FIGS. 5 and 6 (to be referred to as a type-I curing apparatus) is of the single trough type. Two vertically movable plates 77 are fitted in a pair of guides 76 fixed to the side wall 71 of the curing trough. Each plate has a semi-circular cut 78 to form an inlet 63 or an outlet 65. Liquid medium which flows down through the inlet 63 and outlet 65 is received in receivers 79 provided at both sides of the trough, thereafter being collected in a reservoir 82 having a heater 81 via guide pipes 80. The medium collected in the reservoir 82 is heated by the heater 81, and returned to the curing trough 60 by the pump 72 via a temperature adjusting device 83 which controls the temperature thereof.

The heating medium suitable for the present invention is a liquid medium such as a molten eutectic mixture of inorganic salts, molten eutectic mixture of metals, or organic liquid having a high boiling point, i.e., above the curing temperature used, more preferably boiling above 300°C., and a fluidized bed may also be used as a heating medium.

As shown in FIG. 1, the core W whose covering layer has thus been cured reaches a washing device G, where the heating medium adhering to the surface of the coated layer is removed. The washing of the core may, for instance, be carried out by immersing it in a washing liquid capable of easily dissolving the heating medium or by spraying washing liquid thereon. In order to save the washing liquid and reduce the amount of the heating medium which is lost by adherence to the covered layer, a squeezing device made of cotton, silicone rubber foam, etc. may be provided at the exit of the curing trough or just rear thereof. Most of the heating medium adhering to the surface of the covering layer of the core is swept off by the squeezing device, while the core is withdrawn from the trough. When a molten eutectic mixture of inorganic salts is used as a heating medium, it is preferred to wash the covered layer with warm water at about 60°C. or higher because such an eutectic mixture can easily be removed by dissolving the mixture in warm water. The removal of the medium is more complete if the warm water is applied to the core while brushing its surface with a suitable brush or imparting ultrasonic vibrations to the core or the washing liquid.

The core which has gone through the washing process is directly wound up on a drum H or wound thereon after cooling, if desired.

The invention will now be described in greater detail by reference to the following non-limiting Examples and Comparative Examples, in which all parts and percentages are by weight unless otherwise indicated.

EXAMPLE 1

The electric wire manufacturing apparatus used in this examples comprised a hot air circulating drying cylinder having a length of 20 m whose inside temperature was kept at 110°C., an electrically heated heating cylinder having a length of 2 m whose inside temperature was kept at 180°C., an extruder crosshead kept at 90°C., and (type I) curing apparatus 20 m long filled with a molten eutectic mixture of 53 % KNO₃-7 % NaNO₃-40 % NaNO₂ (by weight) kept at 200°C. This eutectic melts at 140°C.

Three electric wires each of which had a natural rubber insulation layer 1.2 mm thick were stranded together with jute, and a cotton tape was wound about the outer surface of the stranded material to form a core having an outer diameter of 10.3 mm. This core was passed through the above-described appartus at a speed of 1 m/min. Natural rubber based Composition I shown in Table 1 was extruded around the core to such an extent that its outer diameter became 13.1 mm by means of extruding apparatus of the type shown in FIG. 2 comprising a first extruder having a screw whose L/D ratio and compression ratio were 12 and 1.5, respectively, and a cylinder whose inner diameter was 70 mm, a second extruder having a screw whose L/D ratio and compression ratio were 8 and 1.5, respectively, and a cylinder whose inner diameter was 70 mm, and a vacuum chamber having a four-blade rotary cutter. The barrels of the first and second extruders were controlled to be at temperatures of 60° and 70°C, respectively.

The cutter was rotated at a speed of 1700 r.p.m., and the composition was sliced into flakes 30 microns thick. The inside of the vacuum chamber was maintained at 60 Hgmm.

The core, covered with the natural rubber based composition I after extrusion, was introduced into the curing trough without being bent between the extrusion apparatus and the curing trough and was then withdrawn from the curing trough by a guide wheel located 5 m from the inlet of the curing trough (the effective curing time was 5 minutes and the effective length of the curing trough 5 meters).

The temperature of the core, just before its entry into the crosshead, measured by a copper-constantan thermocouple inserted about 1 mm into the core surface, was found to be 178°C.

After curing the heating medium remaining on the surface of the covered layer was removed by washing with water.

The electric wire was thus compactly jacketed with a cured natural rubber layer free of porosity and could be produced without any problems over a 5 hours period.

Table 1

| Ingredients (parts) | Composition I (formulation for sheathing) | Composition II (formulation for sheathing) | Composition III (formulation for insulation) |
|---|---|---|---|
| Natural rubber (smoked sheet No. 2, Specific Gravity, 0.91; Mooney Viscosity, 50 (ML₁₊₄ at 100°C)) | 100 | — | — |
| Polychloroprene (M-40, product of Denki Kagaku Co. Ltd., Specific Gravity, 1.23; Mooney Viscosity, 42 (ML₁₊₄ at 100°C)) | — | 100 | — |
| Ethylene/propylene/diene terpolymer (Nordel 1040, E. I. du Pont de Nemours & Co., Specific Gravity, 0.86–0.87; Mooney Viscosity, 40 (ML₁₊₄ at 100°C)) | — | — | 100 |
| Hard clay (Dixie clay, Specific Gravity, 2.62; Specific Heat, 0.20; Water Content, less than 5%; Ignition Loss, 13,4%) | — | 50 | 100 |
| Talc (Specific Gravity, 2.7; Specific Heat, 0.207) | 30 | — | — |
| Carbon black (FEF black, Specific Gravity, 1.7–1.9; pH, 7.5; Particle Diameter, 40 mµ) | 10 | — | — |
| Carbon black (HAF black, Specific Gravity, 1.7–1.9; pH, 8.1; Particle Diameter, 30 mµ) | 10 | 25 | 4 |
| Stearic acid (m.p., 69.3°C; Specific Gravity, 0.85) | 2 | 1 | 2 |
| Zinc oxide (Specific Gravity, 5.5) | 5 | 5 | 5 |
| Paraffin (m.p., 50°C; Specific Gravity, 0.88) | 5 | — | — |
| Tetramethyl thiuram disulfide | 3 | — | — |
| Aldol-α-naphthylamine | 2 | 2 | — |
| Magnesium oxide (Ignition Loss, 8.61%) | — | 4 | — |
| Process oil (Specific Gravity, 0.937; Aniline Point, 95.7°C; Viscosity (SUS; sec.), 90 at 98.9°C and 2200 at 37.8°C) | — | 15 | — |
| 2-Mercaptoimidazoline | — | 0.7 | — |
| Dicumyl peroxide | — | — | 2.7 |
| Sulfur | — | — | 0.3 |

EXAMPLES 2 TO 6 AND COMPARATIVE EXAMPLES 1 TO 2

Electric wires in Examples 2 to 6 and comparative examples 1 to 2 were produced employing the cores and apparatus shown in Table 2. The manufacturing conditions and the results of these examples and comparative examples are also shown in Table 2.

The curing time in each examples was adjusted in such a manner that the covered core was withdrawn from the trough by means of a guide wheel set at a position which permited the desired curing time to be achieved.

In Examples 3, 5 and 6, the core was dried while wound up on a drum.

Table 2

| Runs Nos. | Example 2 |
|---|---|
| Wire core | A core with an outer diameter of 18.4mm constructed by stranding three conductors (each of which has a cured natural rubber insulation layer 1.2mm thick) together with a jute filler, and then winding a cotton tape around the stranded core. |
| Length of the heat-drying cylinder B in meters | 85 |
| Conditions for heating and drying the core | 120°C × 15 minutes |
| Length of the additional heating cylinder C in meters: | 6 |

Table 2 — Continued

| Runs Nos. Wire core | Example 2 A core with an outer diameter of 18.4mm constructed by stranding three conductors (each of which has a cured natural rubber insulation layer 1.2mm thick) together with a jute filler, and then winding a cotton tape around the stranded core. |
|---|---|
| Heating conditions therein | 200°C × 1 minute |
| Surface temperature of the core immediately before entry into the crosshead D (°C) | 183 |
| Coating composition extruded onto core | Composition-II |
| Conditions for extruding the coating composition | |
| L/D ratio | 15 |
| First extruder Compression ratio | 1.2 |
| Barrel Temperature(°C) | 60 |
| Speed of the rotating cutter (r.p.m.) | 240 |
| Thickness of sliced flakes (microns) | 23 |
| Degree of vacuum of the vacuum chamber (mmHg) | 50 |
| L/D ratio | 9 |
| Second extruder Compression ratio | 1.2 |
| Barrel temperature(°C) | 60 |
| Temperature of the crosshead D (°C) | 90 |
| Outside diameter of the coated wire (mm) | 21.8 |
| Type of curing trough and its effective length* (m) | Type-I, 13.8 |
| Curing conditions (same liquid medium as was used in Example 1) | 200°C × 2.5 minutes |
| Speed of the core (m/min.) | 5.5 |
| Observations | Wire covered with a cured layer free from porosity and blisters could be manufactured over a period of 1 hr. |

| | Example 3 A core with a diameter of 6.0mm constructed by stranding three conductors each of which has a cured natural rubber insulation layer. | Example 4 A core with an outer diameter of 6.0mm constructed by stranding seven copper conductors 2.0mm in diameter together. | Example 5 A core with an outer diameter of 7.2mm constructed by strand a number of copper conductors and by winding a paper tape around the stranded copper conductors. |
|---|---|---|---|
| | Batchwise drying | 45 | Batchwise drying |
| | 90°C × 30 minutes | 140°C × 2 minutes | 130°C × 10 minutes |
| | 1.2 | — | — |
| | 200°C × 10 seconds | — | — |
| | 136 | 135 | 128 |
| | Composition-II | Composition-III | Composition-II |
| | 12 | 12 | 15 |
| | 2 | 2 | 1.2 |
| | 80 | 70 | 80 |
| | 4300 | 3900 | 3200 |
| | 17 | 15 | 35 |
| | 20 | 60 | 20 |
| | 8 | 8 | 9 |
| | 2 | 2 | 1.2 |
| | 50 | 70 | 50 |
| | 90 | 100 | 90 |
| | 15.0 | 8.4 | 11.8 |
| | Type-II, 29.2 | Type-II, 66.0 | Type-II, 86.5 |
| | 180°C × 4 minutes | 190°C × 3 minutes | 180°C × 3.5 minutes |
| | 7.3 | 22.0 | 24.7 |
| | Same as in Example 2 | Same as in Example 2 | Same as in Example 2 |
| | Example 6 | Comparative Example 1 | Comparative Example 2 |
| | Same as Example 2 | Same as Example 5 | Same as Example 2 |
| | Batchwise drying | 75 | — |
| | 120°C × 40 minutes | 130°C × 5 minutes | — |
| | — | — | — |
| | 120 | 130 | 25 |
| | Composition-II | Composition-II | Composition-II |
| | 15 | 15 | 15 |
| | 1.2 | 1.2 | 1.2 |
| | 60 | 80 | 60 |
| | 240 | 3200 | 240 |
| | 23 | 35 | 23 |
| | 50 | 20 | 50 |
| | 9 | 12 | 9 |
| | 1.2 | 2 | 1.2 |
| | 60 | 50 | 60 |
| | 90 | 90 | 90 |
| | 21.9 | 11.8 | 21.8 |
| | Type-I, 13.8 | Type-I, 51.5 | Type-I, 13.8 |
| | 200°C × 2.5 minutes | 180°C × 3.5 minutes | 200°C × 2.5 minutes |
| | 5.5 | 14.7 | 5.5 |
| | A wire covered with a cured layer free of porosity but with slight separation of the cured layer from the core was manufactured. | Scorching began to occur about 10 minutes after the start of operation, and became vigorous after 30 minutes. Operation was discontinued. | The coated layer was broken at random points along the product because of increased pressure between the layer and the core due to gases generated by the omission of the drying step. |

What is claimed is:

1. A method for manufacturing a multilayered fabricated article which comprises extruding an uncured rubber or extrudable and then curable rubbery polymer material by a first extruder having a compression ratio of 1.2 to 3 into a vacuum chamber, reducing the size of the extruded composition in said chamber by comminuting or slicing to a small thickness with a cutter, feeding the comminuted or sliced pieces to a second extruder while maintaining the pieces under reduced pressure, extruding the composition by the second extruder around a core which has been dried and heated prior to said second extrusion to a temperature of at least 90°C, and at least the surface of the core being kept at a temperature not lower than the temperature which is 90°C lower than the curing temperature, and introducing the covered and shaped core without substantially bending or causing deformation of the same into curing means containing a heating medium, wherein said covered core is contacted with the heating medium which elevates the temperature of the uncured rubber or plastic composition, whereby the uncured rubber or plastic layer around the core is heated and cured at substantially atmospheric pressure, said first and second extruders being provided such that the sum of the L/D ratio of the first extruder and the L/D ratio of the second extruder does not exceed 24, and with the L/D ratio of said first extruder being at least 8.

2. The method of claim 1 wherein at least the surface of the core is kept at a temperature not lower than the temperature which is 60°C. lower than the curing temperature.

3. The method of claim 1 wherein the rubber or rubbery polymer material extruded from the first extruder is comminuted or sliced in the vacuum chamber to a thickness of about 40 microns or less.

4. The method of claim 1 wherein the vacuum chamber is maintained at a pressure of about 100 mmHg or less.

5. The method of claim 1 wherein the inside wall of the vacuum chamber is coated with a material which does not stick to the cut rubber or rubbery polymer material.

6. The method of claim 5 wherein said material is polyltetrafluoroethylene.

7. The method of claim 1 wherein the cut rubber or rubbery polymer material is fed into a feed inlet of the second extruder by a feed device provided at the feed inlet of the second extruder.

8. The method of claim 1 wherein a crosshead of the second extruder is provided with a long land die having a land length of at least 50 mm.

9. The method of claim 1 wherein a crosshead of the second extruder is provided with a long land nipple having a land length of at least 25 mm.

10. The method of claim 1 wherein said curing means is a curing bath containing a liquid heating medium kept at about 150° to 250°C.

11. The method of claim 10 wherein said heating medium is a molten eutectic mixture of inorganic salts.

12. The method of claim 11 wherein the covered core cured by a molten eutectic mixture of inorganic salts is washed with warm water held at a temperature not lower than about 60°C. to thereby remove the salts remaining on the surface of the cured layer.

13. The method of claim 12 wherein said remaining salts are removed by also contacting the covered core with a rotating brush.

14. The method of claim 12 wherein said remaining salts are removed by the application of ultrasonic vibrations.

15. The method of claim 10 wherein said heating medium is a molten eutectic mixture of metals.

16. The method of claim 10 wherein said heating medium is an oroganic liquid having a boiling point above the curing temperature.

17. The method of claim 1 wherein the curing means comprises a trough containing a liquid heating medium and wherein the core covered with the uncured rubber or rubbery polymer material by the second extruder is introduced into the trough through an inlet provided in a side wall of the trough, and the heating medium flows out from the inlet and is collected in a receiver.

18. The method of claim 10 wherein the heating medium comprises a fluidized bed.

19. Th method of claim 1 wherein the heating medium comprises a heated gas.

20. The method of claim 1 wherein the heating medium comprises ultrasonic high frequency radiation.

21. The method of claim 1 wherein the uncured rubber or rubbery polymer material contains a curing agent.

22. A method for manufacturing a multilayered fabricated article which comprises extruding an uncured rubber or extrudable and then curable plastic composition by a first extruder into a vacuum chamber, reducing the size of the extruded composition in said chamber by a cutter, feeding the thus cut composition to a second extruder while maintaining the sliced composition under reduced pressure, extruding the composition by the second extruder around a core which has been dried and heated prior to said second extrusion, and introducing the covered core without substantially bending the same into curing means containing a heating medium, wherein said covered core is contacted with the heating medium which elevates the temperature of the uncured rubber or plastic composition, whereby the uncured rubber or plastic layer around the core is heated and cured at substantially atmospheric pressure, said curing means comprising an upper trough and a lower trough, both of which contain a liquid heating medium, and wherein the core covered with the uncured rubber or plastic composition by the second extruder is firstly introduced into the upper trough through an inlet provided in a side wall of the upper trough, advanced in the upper trough horizontally while maintained in the straightened condition while contacting only the heating medium, withdrawn from the upper trough through an outlet provided in a wall of the upper trough and then introduced into the lower trough located below the upper trough via a turning wheel, said first and second extruders being provided such that the sum of the L/D ratio of the first extruder and the L/D ratio of the second extruder does not exceed 24, and with the L/D ratio of said first extruder being at least 8.

23. The method of claim 22 wherein the heating medium flowing out from the inlet of the upper trough falls into the lower trough, and the medium in the lower trough is circulated into the upper trough.

24. The method of claim 22 wherein the core covered with the rubber or plastic composition which has been introduced into the lower trough is advanced horizontally through the heating medium in the lower trough, and is then again introduced into the upper trough.

25. The method of claim 22 wherein the core covered with the rubber or plastic composition which has been introduced into the lower trough is advanced horizontally through the heating medium in the lower trough, and then again advanced through the heating medium in the lower trough.

* * * * *